United States Patent [19]

Hoffman

[11] Patent Number: 4,500,386

[45] Date of Patent: Feb. 19, 1985

[54] CONTAINER FEED FOR LABELING MACHINE

[75] Inventor: Wolfgang Hoffman, Modesto, Calif.

[73] Assignee: B & H Manufacturing Company, Inc., Ceres, Calif.

[21] Appl. No.: 485,754

[22] Filed: Apr. 18, 1983

Related U.S. Application Data

[63] Continuation of Ser. No. 783,285, Mar. 31, 1977, abandoned.

[51] Int. Cl.[3] .............................................. B32B 31/00

[52] U.S. Cl. .................................... 156/449; 156/450; 156/458; 156/567; 156/568

[58] Field of Search ............... 156/567, 568, 448, 449, 156/450, 458, 446, 447, 451, 455, 456, 417; 131/27, 94

[56] References Cited

U.S. PATENT DOCUMENTS

| | | | |
|---|---|---|---|
| 787,744 | 4/1905 | Fisher et al. | 156/456 X |
| 2,585,250 | 2/1952 | Jones et al. | 156/449 |
| 2,773,617 | 12/1956 | Weiss | 156/449 |
| 3,091,245 | 5/1963 | Rudsyinat | 131/94 |
| 3,562,050 | 2/1971 | Hake et al. | 156/215 |
| 3,690,997 | 9/1972 | Bofinger et al. | 156/448 |
| 3,794,048 | 2/1974 | Molins et al. | 131/94 |

FOREIGN PATENT DOCUMENTS 777133 6/1957 United Kingdom .

*Primary Examiner*—David Simmons
*Attorney, Agent, or Firm*—Edward B. Gregg

[57] ABSTRACT

Cylindrical containers are fed by a star wheel or the like such that their sides come into tangential contact with a label-bearing vacuum drum having a resilient outer portion. A resilient roll-on pad is disposed opposite the vacuum drum and at a distance therefrom such that containers fed into tangential contact with the vacuum drum will be rotated (as viewed in the drawing) as they contact glue-containing labels held on the drum. The roll-on pad preferably has an outwardly slanting portion at its container-receiving end, and a length of contacting surface of about twice the diameter of the containers to be labeled. Accordingly, labels can be cut and fed onto the vacuum drum, after which glue is applied to the exposed surface thereof, and the containers fed between the vacuum drum and the roll-on pad to securely bond each severed label to a separate container in rapid succession.

4 Claims, 1 Drawing Figure

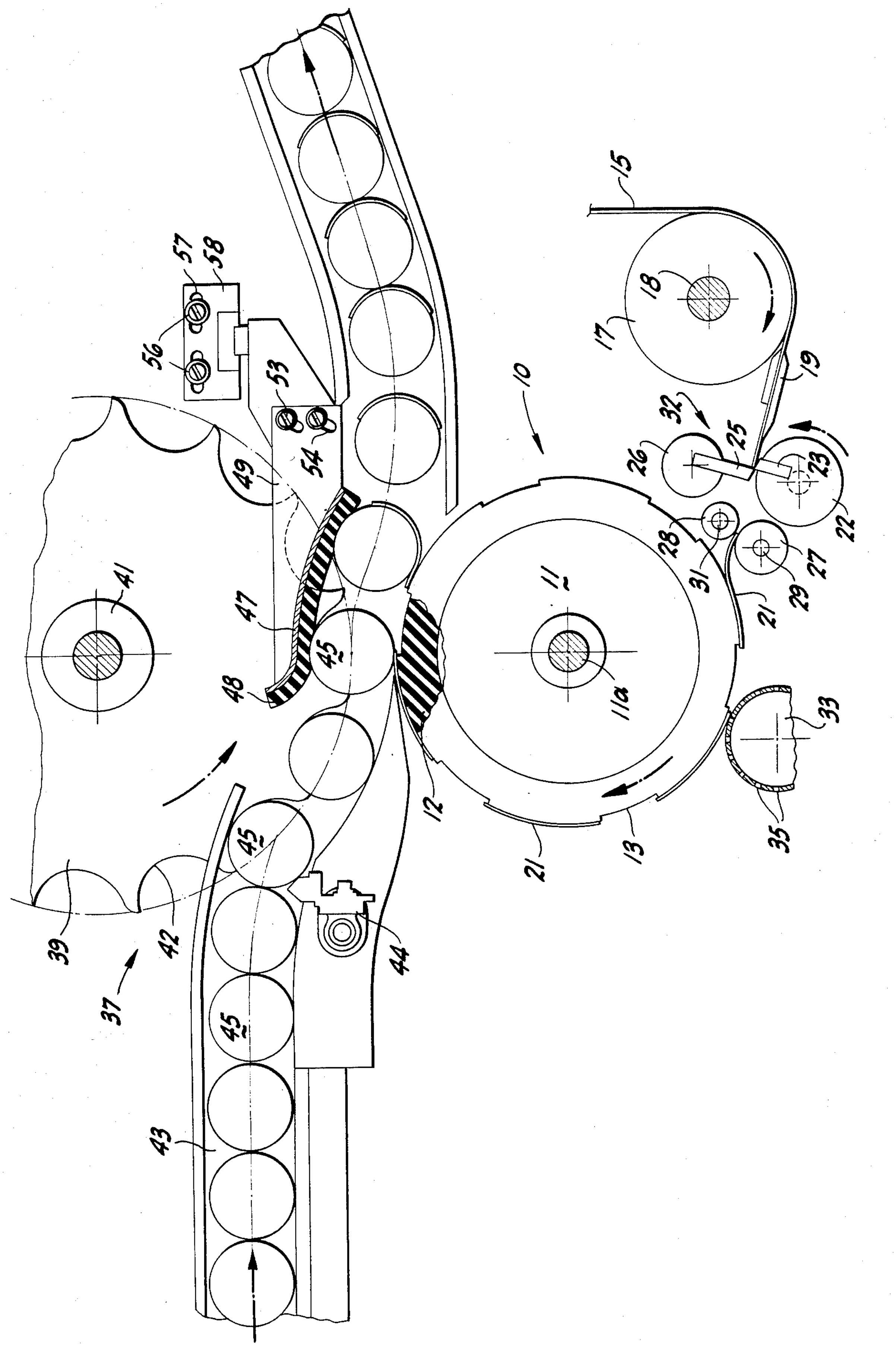
15
18
17
19
10
32
25
26
23
22
28
27
31
29
21
11
11a
33
35
13
21
12
57
58
56
53
54
49
47
48
45
41
45
39
42
37
44
45
43

CONTAINER FEED FOR LABELING MACHINE

This application is a continuation of application Ser. No. 783,285 filed Mar. 31, 1977, now abandoned.

This invention relates to apparatus for the high speed application of labels to cylindrical containers, and is an improvement upon my U.S. Pat. Nos. 3,765,991 and 3,834,963, and my application Ser. No. 480,044, filed June 17, 1974 entitled "Apparatus for Applying Labels to Containers" now U.S. Pat. No. 4,108,710.

In the aforesaid patents and patent application, there are described machines for applying labels to containers having general features as follows: A container feed such as a turret having pockets for holding the containers is employed and serves to carry each container, in turn, past a glue applicator station which applies a line of glue to the container and then passes each container, in turn, tangentially to a vacuum drum which bears labels, each having its trailing end provided with a line of glue. The containers are gripped during this period to avoid rotation about their individual axes, whereby as each container is presented to the tangent point of contact with the drum, the leading end of each label is applied to the container at the glue line previously applied to the container. The container is then transported away from the vacuum drum and is caused to rotate about its axis, which results in wrapping the label around the container.

The vacuum drum is ordinarily equipped with lands on which the trailing edge of each label is applied, the label being held on the drum by vacuum. A glue applicator applies glue to the trailing end of the label overlying the land. Immediately to the rear of and adjacent to each land is a trough or groove which serves the function of holding any excess glue. The labels themselves are supplied as a continuous label stock and are cut by a shearing action of a rotary blade and a stationary blade. The stationary blade, however, is oscillated into and out of contact with the rotating blade so as not to impede access of the label material to the cutting instrumentalities.

The particular mechanisms just described, although preferably employed in accordance with the present invention as shown in the drawing, need not be exactly as described but may vary, inasmuch as the invention pertains to certain improvements which will be described shortly.

While machinery of this type has served well in the high-speed application of labels to a wide variety of containers, difficulties at higher speeds have at times been encountered in accomplishing an adequate wrapping of a label around each container. Also, such machinery has usually required clamping or gripping of the containers during contact with the vacuum drum, a requirement which for some applications has been unduly burdensome.

It is an object of the present invention to provide improvements in container feed mechanisms of the general character described.

It is a further and particular object of the invention to provide a container feed apparatus of the general character described wherein clamping of the containers during the labeling operation is not required.

It is a further object of the invention to provide machinery of the general character described which is better adapted than heretofore for application of labels to bottles and similar cylindrical containers in a high-speed, fully automatic process.

The above and other objects of the invention will be apparent from the ensuing description and the appended claims.

Certain embodiments of the invention are shown by way of example in the accompanying drawing showing a plan view of a labeling apparatus in accordance with the invention, with a star wheel feed means for feeding containers between a resilient roll-on pad and a label-containing vacuum drum having a resilient outer portion.

Referring now in more detail to the drawing, the labeling apparatus is generally designated by the reference numeral 10 and comprises a vacuum drum 11 on a shaft 11_a_, the drum having an outer resilient portion 12 and axial groove 13, as in the aforementioned patents and patent application, to receive any excess glue that may be present. A continuous strip of label stock 15 is fed by feed roller 17 on shaft 18 through guide means 19 where it is served into individual labels 21 by a cutting mechanism including rotary cutter 22 having knife 23 bolted, as shown, to a support, and a stationary, albeit oscillating, knife 25 in a holder 26. Knife 25 is pivoted out of the way during part of each cycle to allow passage of label stock 15, but is held stationary at the time of cutting.

Knife holder 26 is pivoted to and from the position shown by suitable means, for example that shown at 147, 148 in FIG. 9 of my copending application Ser. No. 480,044 entitled "Apparatus for Applying Labels to Containers" filed June 17, 1974, now U.S. Pat. No. 4,108,710 or by a hydraulic cylinder and rod. Stops can be provided to limit movement of the knife 25, and a spring can be used to return such knife to a cutting position.

Rollers 27 and 28 rotatable on shafts 29 and 31, respectively, grip label stock 15 just before an individual label 21 is cut therefrom and retain this grip until the leading end of the severed label is in contact with the vacuum drum 11 and is held by vacuum thereon. Roller 27 is driven and roller 28 is an idler roller. Roller 28 can be biased against roller 27 by suitable biasing means.

Glue applicator 33 is disposed in tangential relationship with vacuum drum 11 and has applicator holes 35 through which glue can be applied from the applicator over the exposed surface of the severed labels 21. Lands (not shown) can be provided on the vacuum drum below either or both ends of the severed strips 21 to allow application of glue only to the end portions of each strip; alternatively, in a preferred method, glue can be applied in a pattern of beads over the exposed surface of each strip in accordance with properly positioned applicator holes 35.

Feed roller 17, rotary cutter 32, vacuum drum 11, and glue applicator 35, as well as driven roller 27 and the oscillating means for oscillating knife 25, are all operated in suitable synchronism by means well known in the art and requiring no description herein.

Container feed mechanism 37 comprises star wheel 39 rotatable on shaft 41, the star wheel having pockets 42 conforming to the round side of the containers to be labeled, and conveyer 43 for moving containers in a side-by-side upright position at high speed in the direction of arrows past vacuum drum 11 with the sides of the containers in tangential contact with the working surface of drum 11. Container stop 44 pivots in synchronism with the rotation of star wheel 39 to allow each container to be advanced into an open pocket 42 of the star wheel 39.

Roll-on pad 47, having outwardly flaring portion 48 at its container-receiving end, is disposed on arm 49 opposite the working surface of vacuum drum 11 at a distance therefrom of slightly less than the diameter of each container 45. The roll-on pad 47 is formed of a resilient material, such as foam rubber, such that containers will be pressed firmly against vacuum drum 11 as they are fed by the star wheel 39 in the direction shown by the arrows. Also, as containers contact the stationary roll-on pad 47 on one side of the container and the rotating vacuum drum on the other side thereof, the containers are caused to roll in a counterclockwise direction (as viewed in the drawing) such that the glue-containing label 21 will be rolled off the vacuum drum 11 onto the side of the container 45 and firmly bonded thereto, all in a smooth, continuous operation.

Roll-on pad 47 can be adjusted laterally and to increase or decrease pressure on the container. Screws 53 are disposed in slots 54 of arm 49 to allow the roll-on pad 47 to be moved toward or away from the containers, to thereby decrease or increase pressure thereon. Screws 56 in slots 57 of bracket 58 permit lateral adjustment of roll-on pad 47. Accordingly, roll-on pad 47 can be properly positioned for containers of varying sizes and for labels containing varying patterns of glue.

Operation of the machine will be evident from the foregoing description. Among the advantages thereof are the fact that the container feed mechanism maintains control of the containers throughout the labeling operation, as the containers are conveyed from left to right in the direction of the arrows. Separate clamping means or the like to hold the containers motionless for the label application procedure are not required. In short, the container feed apparatus of this invention provides a smooth and continuous high-speed apparatus for applying labels to cylindrical containers.

I claim:

1. Labeling apparatus comprising:

(a) a cylindrical rotary label transport and a rotary container transport-label applicator rotating about parallel axes (b) means for rotating such label transport and container transport-label applicator in opposite directions about their parallel axes said label transport being adapted, as it rotates, to pick up labels at a label pick up station, to transport each label on its cylindrical surface and to release each label at a label applying station said container transport-label applicator having angularly spaced, peripheral pockets each adapted to cradle a cylindrical container with its cylinder axis parallel to the axis of the label transport and the axis of the container transport-label applicator, the outermost surface of each cradled container, as it rotates about the axis of the container transport-label applicator, describing a segment of a cylinder which is concentric to the axis of the container transport-label applicator said label transport and container transport-label applicator being spaced apart by a gap such that each container, as it passes into such gap, is tangent to the label transport (c) an upstream container guide disposed with its downstream terminus substantially tangent to said label transport, such upstream guide acting to hold each cradled container in its pocket until said container reaches such gap, is tangent to the label transport and picks up and adheres to the leading edge of the label at the labeling station and (d) a downstream container guide and label applicator concentric to the axis of the label transport, such guide and applicator being spaced from the label transport and located so that it will extract each container, in turn, from its pocket with the leading end of a label attached to its surface and will roll the container on the label transport to wrap the respective label about it;

such upstream container guide, container transport-label applicator, downstream container guide and label transport causing each container to traverse an S-shaped path, the initial part of which is formed by the upstream guide and container transport-label applicator and is concave to the container transport-label applicator, the terminal part of such path is formed by the downstream guide and label transport and is concave to the label transport and the portion of such path at the inflection of the S being located at said gap, whereby each container is caused to pass smoothly through such path under continuous positive control by the elements forming such path.

2. The apparatus of claim 1 wherein said container guide and label applicator is adjustably mounted to accommodate containers of different diameters.

3. The apparatus of claim 2 wherein the adjustable mounting of the container guide and label applicator is also capable of shifting the aforesaid guide and applicator circumferentially with respect to the label transport to adjust the point of transfer of containers from the container transport-label applicator to the container guide-label applicator and label transport.

4. The labeling apparatus of claim 1 wherein the pockets of the container transport-label applicator are of a depth such that a portion of the cylindrical surface of the container projects from the respective pocket.

* * * * *